R. R. GROCE.
MEASURING DEVICE.
APPLICATION FILED MAY 16, 1917.

1,270,149.

Patented June 18, 1918.

WITNESSES

INVENTOR
R. R. Groce,
BY Victor J. Evans
ATTORNEY

UNITED STATES PATENT OFFICE.

RODNEY R. GROCE, OF PARKERSBURG, WEST VIRGINIA.

MEASURING DEVICE.

1,270,149.  Specification of Letters Patent. Patented June 18, 1918.

Application filed May 16, 1917. Serial No. 169,014.

*To all whom it may concern:*

Be it known that I, RODNEY R. GROCE, a citizen of the United States, residing at Parkersburg, in the county of Wood and State of West Virginia, have invented new and useful Improvements in Measuring Devices, of which the following is a specification.

This invention relates to measuring devices especially adapted to be used for ascertaining the depth of bored or drilled wells and it consists in the novel features hereinafter described and claimed.

An object of the invention is to provide a device as stated which may be conveniently used for quickly ascertaining the depth of the well without necessitating the use of a long field line as is at present generally employed.

With this object in view the device includes a box having a shaft journaled therein and carrying a pulley which is exactly twelve inches in circumference. The sand or baling line which is used at the well is trained over the said pulley when it is desired to ascertain the depth of the well. Two dials are journaled upon the box or casing and are provided at their exposed surfaces with numbers or figures which are consecutively arranged about the peripheral portions thereof. Means are provided whereby when one dial completes a revolution or rotation it turns the other dial one step or stage. Means are provided in conjunction with the said shaft for turning the initial dial by stages so that each revolution of the shaft is registered at the initial dial. When the initial dial completes its rotation this is indicated at the final dial inasmuch as the last mentioned dial is turned one stage or step. By such an arrangement the sand or baling line which passes over the said pulley and which is lowered into the well will turn the pulley and shaft and during the lowering movement the number of feet in units and hundreds are registered at the dial and hence the depth of the well may be readily ascertained with accuracy in a short space of time.

In the accompanying drawing:—

Figure 1:
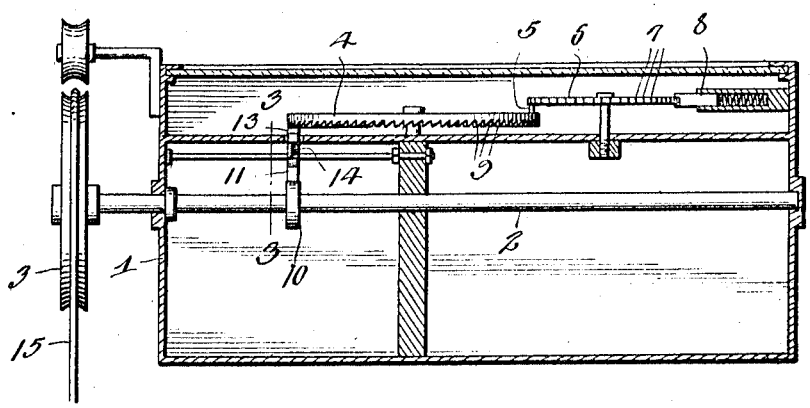
Figure 1 is a sectional view of the measuring device.
Figure 2:
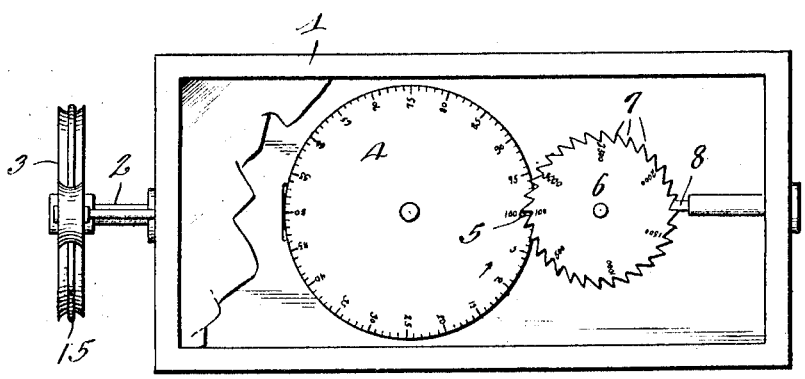
Fig. 2 is a top plan view of the same.
Figure 3:
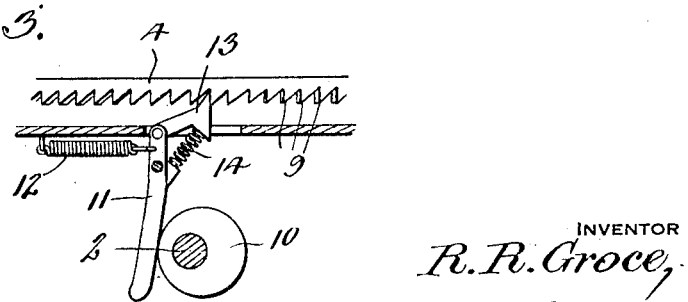
Fig. 3 is a fragmentary sectional view of the same cut on the line 3—3 of Fig. 1.

As illustrated in the accompanying drawing, the measuring device comprises a box or casing 1 in which is journaled a shaft 2. One end of the shaft 2 projects beyond the end of the casing 1 and carries a grooved pulley 3. This pulley is exactly twelve inches around its circumference. An initial dial 4 is journaled at the top of the box or casing 1 and carries upon its upper surface a series of numbers or figures which are arranged consecutively from one to one hundred. The dial 4 is provided in the vicinity of its periphery and adjacent the numeral one hundred with an upstanding pin 5. A final dial 6 is also journaled at the top side of the box or casing 1 and is provided at its periphery with teeth 7 which lie in the path of movement of the pin 5. The dial 6 is provided at its upper surface with a series of numbers consecutively arranged and preferably extending from the numeral 100 to the numeral 3000. A spring pressed pawl 8 is movably mounted at the top of the box or casing 1 and is adapted to engage the teeth 7 and restrain the dial 6 against movement in one direction but adapted to permit the said dial to turn in an opposite direction.

The dial 4 is provided at its underside and in the vicinity of its periphery with teeth 9. An eccentric disk 10 is mounted upon the shaft 2 and is located within the box or casing 1. A lever 11 is fulcrumed within the casing and a spring 12 is connected at one end with said lever and at its other end with the casing and is under tension with a tendency to hold the free end portion of the lever 11 against the periphery of the eccentric disk.

A pawl 13 is pivotally connected with the upper end of the lever 11 and a spring 14 is interposed between the free end portion of the said pawl 13 and the intermediate portion of the lever 11 and is under tension with a tendency to hold the free end of the said pawl in the path of movement of the teeth 9. The sand or baling line is indicated at 15.

When it is desired to ascertain the depth of the well the sand or baling line 15 is trained over the pulley 3 and is then lowered into the well. As the said line 15 moves over the pulley 3 the said pulley is rotated and in turn the pulley rotates the shaft 2. At each rotation of the shaft 2, the eccentric pin is carried around the axis thereof and inasmuch as the lever 11 bears against the periphery of the said eccentric the said lever is swung upon its pivot and in turn the pawl 13 is moved longitudinally. In view of the fact that the spring 14 is interposed between the said pawl and the lever 11 the pawl is held in engagement with one of the teeth 9 and as the pawl moves in one direction the initial dial 4 is turned one stage or step and as the pawl 13 moves in an opposite direction the spring 14 is compressed and the free end of the pawl 13 slides under the end of the next adjacent tooth and upon the succeeding forward movement of the pawl 13 the dial 4 is again moved one stage or step. When the dial 4 has been turned one hundred stages or steps which indicates that the line 15 has descended one hundred feet in the well the pin 5 engages one of the teeth 7 upon the dial 6 and this dial, which is termed the final dial, is turned one stage or step and hence each complete revolution of the dial 4 is indicated by the dial 6. In other words, the dial 4 may register the number of feet that the line descends from 1 to 100 and the dial 6 registers or indicates the number of hundreds of feet that the said line has moved down the well.

From the foregoing description taken in conjunction with the accompanying drawing, it will be seen that a measuring device especially adapted to be used for ascertaining the depth of drilled or bored wells is provided, and that the same may be quickly and conveniently used for accurately determining the depth of such well.

Having described the invention what is claimed is:—

A measuring device comprising a support, a shaft journaled thereon, a pulley mounted upon the shaft, a dial journaled upon the support and having its center located above the axis of the shaft whereby the shaft is diametrically disposed with relation to the dial, said dial being provided with teeth located at its underside, a lever pivoted at a point between its ends and at a point between the shaft and the dial, an eccentric mounted on the shaft, a spring for holding one end of the lever in engagement with the eccentric, and a spring pressed pawl mounted at the other end of the lever and engaging the teeth of the dial.

In testimony whereof I affix my signature.

RODNEY R. GROCE.

Copies of this patent may be obtained for five cents each, by addressing the "Commissioner of Patents, Washington, D. C."